United States Patent
Levner et al.

(10) Patent No.: US 12,300,007 B1
(45) Date of Patent: May 13, 2025

(54) AUTOMATIC IMAGE CROPPING

(71) Applicant: Amazon Technologies, Inc., Seattle, WA (US)

(72) Inventors: Ilya Levner, Woodinville, WA (US); Aditya Ghuge, Seattle, WA (US); Tabrez Mohammed, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 426 days.

(21) Appl. No.: 17/957,360

(22) Filed: Sep. 30, 2022

(51) Int. Cl.
*G06V 20/70* (2022.01)
*G06V 10/26* (2022.01)
*G06V 10/74* (2022.01)
*G06V 20/50* (2022.01)

(52) U.S. Cl.
CPC .............. *G06V 20/70* (2022.01); *G06V 10/26* (2022.01); *G06V 10/761* (2022.01)

(58) Field of Classification Search
CPC ....... G06V 20/70; G06V 10/26; G06V 10/761
See application file for complete search history.

(56) References Cited

U.S. PATENT DOCUMENTS

| | | | | |
|---|---|---|---|---|
| 8,009,921 | B2 * | 8/2011 | Csurka | H04N 1/3873 382/277 |
| 2018/0373979 | A1 * | 12/2018 | Wang | G06F 18/24143 |
| 2019/0197129 | A1 * | 6/2019 | Yong | G06F 40/247 |
| 2022/0269895 | A1 * | 8/2022 | Barkan | G06F 18/2113 |
| 2023/0230384 | A1 * | 7/2023 | Chan | G06T 7/70 348/148 |
| 2023/0316803 | A1 * | 10/2023 | Kelkar | G06T 11/00 382/103 |

* cited by examiner

*Primary Examiner* — Bobbak Safaipour
*Assistant Examiner* — Joshua Chen
(74) *Attorney, Agent, or Firm* — K&L Gates LLP

(57) ABSTRACT

Techniques are generally described for cropped image evaluation. In various examples, first image data representing a first image and second image data representing a cropped version of the first image may be received. An image captioning model may be used to generate first text data describing the first image data and second text data describing the second image data. A first encoder may be used to generate first data representing the first text data and second data representing the second text data. In various examples, a third data representing a degree of similarity between the first data and the second data may be generated. In some cases, first computer-executable instructions configured to cause the second image data to be displayed on a display may be generated based at least in part on the third data.

20 Claims, 11 Drawing Sheets

AUTOMATIC IMAGE CROPPING

BACKGROUND

Different devices and/or displays may have support different aspect ratios. Cropping or image padding may be used to resize an image when an image has a different aspect ratio relative to the device and/or display on which the image is to be displayed. Image cropping typically refers to removal of some peripheral portions of the image to resize the image to a smaller version. Manual cropping of images typically involves use of a software tool to select the portion of the image to be retained (e.g., by drawing a box around the retained portion and removing the portion of the image outside the box). Automatic, computer-based cropping techniques are available. However, such automatic techniques may have difficulty ascertaining the most salient portions of the image when deciding where the image is to be cropped.

DETAILED DESCRIPTION

Figure 1:
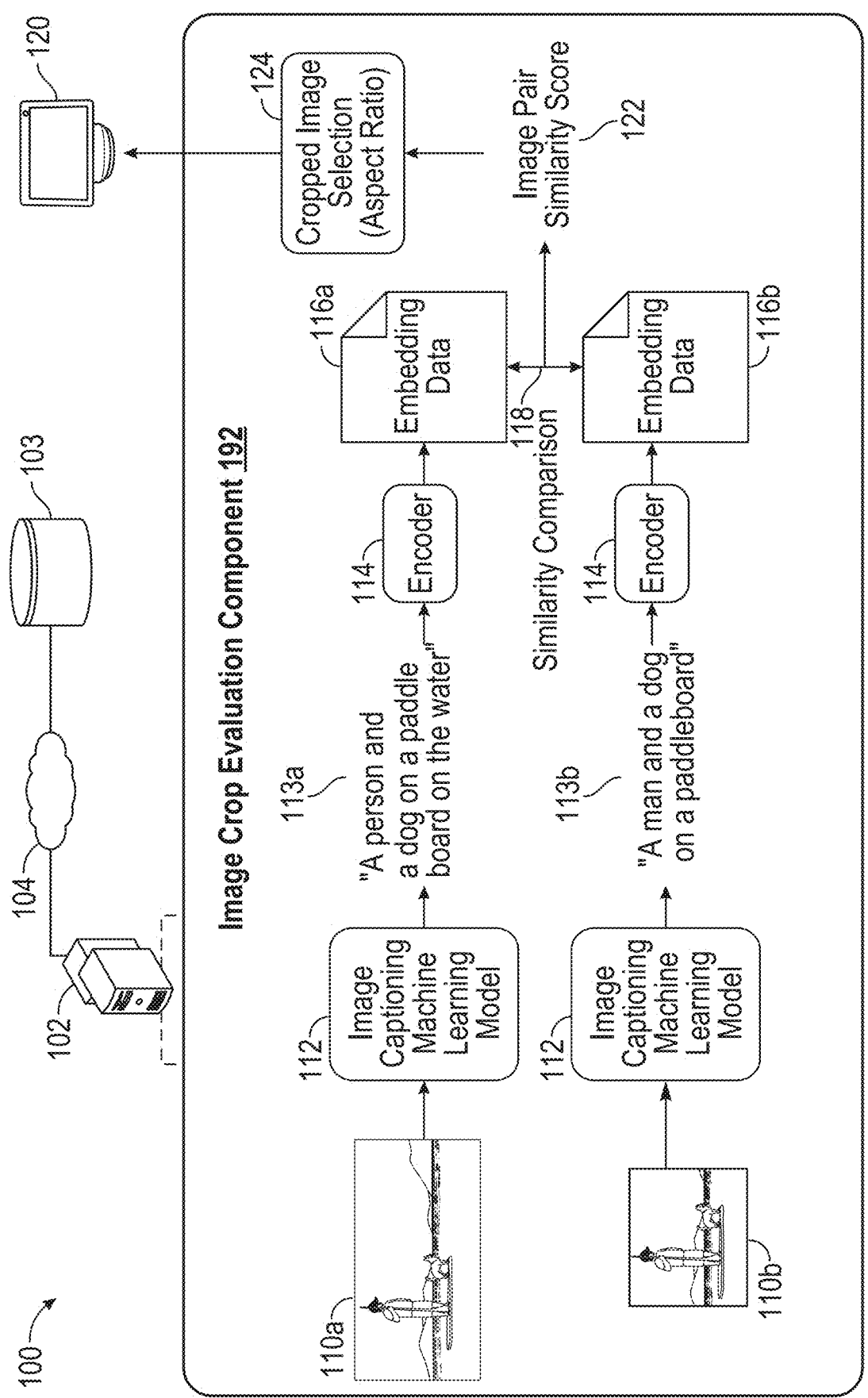
FIG. 1 is a block diagram depicting an example machine learning system effective to evaluate and select image crops in real time, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Image data, whether generated using a camera, created using a graphics tool, displayed in a browser window, downloaded from an online repository, or otherwise obtained or captured may be of varying aspect ratios. However, different devices, device displays, applications, websites, etc., may support specific aspect ratios. Accordingly, there may be a need to crop image data to the specific aspect ratio that is supported by the device and/or system that will display the image data. Cropping image data typically refers to removing some portion of the peripheral areas of the image in order to reduce the size and change the aspect ratio of the image. Image cropping may be performed manually using photo editing tools (or, more generally, image editing tools). For example, an image editing tool may allow a user to select an area in the image which is to be retained by drawing a box (or other polygon) around the area to be retained. The remainder of the image may be removed or "cropped out."

In some examples, automatic cropping software may take image data having a native aspect ratio as input and may output a cropped image that is cropped according to a desired output aspect ratio. However, such automated tools may not crop the image in a way that the image's subject matter maintains semantic fidelity with respect to the original uncropped image. Semantic fidelity between an uncropped image and a cropped version of that image refers to a degree to which the overall visual information between the cropped and uncropped image is preserved. Semantic fidelity can be quantified by encoding each of the images in a numerical representation (e.g., a high-dimensional vector) and then determining a similarity or difference between the two images. For example, a distance can be calculated between the two numerical representations (e.g., a cosine similarity score). In an example, an uncropped image may depict two people standing next to one another in the foreground of an image in front of a building. If the cropped version of the image only depicts one of the two people (i.e., one person is cropped out of the image), the semantic fidelity between the two images may be relatively low. Conversely, if the cropped image crops out some of the background and the cropped image is relatively centered on the two people in the foreground, the semantic fidelity may be relatively high. Maintaining a high semantic fidelity in the cropped image may result in an image that is visually pleasing to a viewer which maintains the most important objects within the field of view.

Described herein are systems and techniques that may be used to automatically generate high quality computer-generated image crops by comparing the semantic content of the uncropped image with a candidate cropped image. Although humans are able to use cropping software to crop images and evaluate the images using the human visual system, humans are unable to reformat content for display on one device or another in real time so that different devices can display the content without stretching the image along one dimension or another. The systems and techniques described herein may be used to ensure that auto-cropping systems maintain semantic fidelity so that real-time reformatting of images can be performed for different device aspect ratios while maintaining the semantic fidelity between images. The techniques described herein improve the performance of current computer-implemented auto-cropping software by ensuring that semantic fidelity is maintained between uncropped and cropped images. Additionally, the various systems and techniques described herein may be used to implement new automatic cropping systems that may be used to crop image data in real time, so that when an image is requested for display on a target device, the image may be automatically reformatted in real time for the aspect ratio of the target device, all while selecting an image crop that maintains semantic fidelity with respect to the uncropped image. Additionally, while humans are able to understand the important parts of an image so that the crop is visually pleasing, it is a non-trivial task to enable a computing device to programmatically and dynamically crop an image for a target aspect ratio in real time while performing the crop in a way that maintains the visually important parts of an image. Without more, a computing device is unable to natively interpret one group of pixels as being more important to the overall visual impression of an image relative to another group of pixels. Accordingly, described herein are particular computer-implemented operations that enable a computing device to evaluate the quality of image crops for automatic image cropping systems.

For example, the systems and techniques described herein can be used to automatically crop images in a way that generates a cropped image that is pleasing to the average viewer (e.g., by maintaining quantifiable semantic fidelity with respect to the input, uncropped image). In addition, the various techniques described herein may be used to evaluate the quality of candidate cropped images by comparing the candidate cropped images to the uncropped image from which the candidate cropped images were created. Various techniques described herein may be used to assess the quality of the candidate cropped images according to each candidate crop's semantic fidelity with respect to the uncropped image. Automatic image cropping and cropping quality evaluation may be used when cropping images for display in different formats. For example, a graphical user interface (GUI) may display an uncropped version of an image when displayed on a web browser on a desktop or laptop computing device. However, a mobile application that displays the GUI may support different aspect ratios. Accordingly, the image may be automatically cropped in order to support the aspect ratio of the mobile application GUI. In general, the techniques described herein may be used to automatically crop images in a way that appears natural to a viewer for any context in which cropped images are used.

Machine learning techniques, such as those described herein, can be used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques can be adaptive to changing conditions. Deep learning algorithms, such as neural networks, can be used to detect patterns in data and/or perform tasks.

In some machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation (e.g., toward having a higher activation value).

In some machine learning models, such as neural networks, after initialization, annotated training data may be used to generate a cost or other type of "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram depicting an example machine learning system 100 effective to evaluate and select image crops in real time, in accordance with various aspects of the present disclosure. In various embodiments, machine learning system 100 comprises computing device(s) 102. Computing device(s) 102 comprise one or more processors with each processor including one or more processor cores effective to execute computer-readable instructions used to perform the various techniques described herein. Computing device(s) 102 may include and/or may be configured in communication with non-transitory computer-readable memory 103. Although a single memory 103 is depicted in FIG. 1, in various examples, multiple memories may be used in accordance with the present disclosure. In various embodiments, memory 103 is a non-transitory computer-readable memory effective to store instructions that when executed by one or more processors of computing device(s) 102 are effective to program the one or more processors to perform the various techniques used to instantiate the machine learning models, automatically generate cropped images, and/or evaluate the quality of cropped images, as described in further detail below.

In various embodiments, computing device(s) 102 and memory 103 are configured in communication over a network 104. Network 104 comprises a local area network (LAN) and/or a wide area network, such as the internet. Computing device(s) 102 and memory 103 communicate with one another and/or with one or more other computing devices over network 104. In some embodiments, computing device(s) 102 are effective to execute an image crop evaluation component 192. In various examples, image crop evaluation component 192 is a service effective to receive input image data 110a and one or more cropped image candidates 110b as inputs. The cropped image candidates 110b may be generated by automatic image cropping software and/or may be manually input. However, as described in various examples below, the image crop evaluation component 192 may be used to generate new automatic image cropping systems that are able to automatically crop image data while maintaining semantic similarity to the input, uncropped image.

The input image data 110a may represent an uncropped image, while the cropped image candidate 110b may be a cropped version of the input image data 110a. For example, in FIG. 1, the input image data 110a represents a person and a dog standing on a paddle board on a lake. In the cropped image candidate 110b, columns of pixels along the left side and right side have been cropped out (removed) with respect to the input image data 110a. In addition, in some examples, rows of pixels along the top and bottom of the image may have been cropped out (removed) with respect to the input image data 110a.

The input image data 110a and the cropped image candidate 110b may be input into an image captioning machine learning model 112. An image captioning machine learning model 112 is a machine learning model that takes image data as inputs, encodes the image data, and uses a generative natural language model to generate a "caption," which is text data intended to describe the visual scene depicted in the input image. Various different image captioning model architectures may be used in accordance with the desired implementation. An example instantiation of image captioning machine learning model 112 is shown and described in reference to FIG. 2. However, the particular machine learning architecture used to implement image captioning machine learning model 112 may vary from implementation to implementation, as desired.

The image captioning machine learning model 112 may generate text data (e.g., an image caption) for each input image, including text data 113a for input image data 110a (the uncropped image) and text data 113b for input cropped image candidate 110b (a particular cropped image candidate). As shown in FIG. 1, because the cropped image candidate 110b depicts a slightly modified scene relative to the uncropped input image data 110a (e.g., part of the mountain in the background is cropped out), the image captioning machine learning model 112 has interpreted the images differently and text data 113a varies with respect to text data 113b. For example, text data 113a is "A person and a dog on a paddleboard on the water" while text data 113b is "A man and a dog on a paddleboard." It could be, for example, that because part of the background is cropped out in cropped image candidate 110b, that the image captioning machine learning model was unable to interpret the background, thus partially accounting for the discrepancy between text data 113a and text data 113b.

The text data 113a and text data 113b (and optionally the input image data 110a and cropped image candidate 110b, depending on the particular implementation) may be input into an encoder 114 to generate respective embedding data 116a and 116b. The particular encoder 114 may vary according to the desired implementation. For example, FIGS. 3A-3D describe different instantiations of the encoder 114 that may be used to generate different embedding data that represent some combination of the input text (e.g., text data 113a, 113b) and/or the input images (e.g., input image data 110a, cropped image candidate 110b). Embedding data may be a numerical representation of the input images and/or text (depending on the encoder 114 implementation). For example, embedding data may be a vector representation of a certain dimensionality, an array (e.g., a feature map), etc. Additionally, while an encoder 114 is generally described herein, the text data 113a and 113b may be input into the same encoder 114 or into two (or more) copies of the encoder 114 (e.g., executing on the same or on different devices) depending on the desired implementation.

Once the embedding data 116a (representing text data 113a and/or input image data 110a) and the embedding data 116b (representing text data 113b and/or input cropped image candidate 110b) is generated, a similarity comparison 118 may be performed to determine a similarity between embedding data 116a and embedding data 116b. For example, if embedding data 116a and embedding data 116b are n-dimensional vectors, cosine similarity, Euclidean distance, and/or some other vector similarity metrics may be used to determine the similarity between the two vectors. The score resulting from the similarity comparison 118 (e.g., cosine similarity score) may be the image pair similarity score 122.

As described in further detail below, in some examples, different techniques (e.g., different metrics) may be used (including, in some cases, different types of encoders 114) to compare the input image data 110a to a given cropped image candidate 110b. Accordingly, for each different metric, there may be a respective image pair similarity score 122. In various examples (though not shown in FIG. 1), the different image pair similarity scores 122 may be input into a neural network or other small model (e.g., a shallow neural network classifier having a relatively small number of hidden layers) to generate an overall score describing a quality of the cropped image candidate 110b. In various examples, the model that fuses the different image pair similarity scores 122 may be a logistic regression model, regression trees, multi-layer perceptron (MLP), etc., depending on the desired implementation. The quality of the crop may be based on semantic fidelity to the visual subject matter of the uncropped input image data 110a since the comparison is between text describing the subject matter of each image as well as potentially between the images themselves (depending on the particular metric being used). In such examples, multiple cropped image candidates for the same uncropped input image may be evaluated and a cropped image selection 124 may be selected based on the overall quality score output by the neural network. However, in other implementations, the quality of a cropped image may be evaluated on the basis of only a single metric (e.g., on the basis of a single image pair similarity score 122 without the neural network or other small model) or on the basis of a selected set of metrics (e.g., a set of image pair similarity scores for the selected metrics). The various different metrics and encoders 114 are described in further detail below.

In any event, the image crop evaluation component 192 may be effective to select a cropped image selection 124 on the basis of at least the image pair similarity score 122. The cropped image selection 124 may have the desired aspect ratio for a particular display of a target device (e.g., target device 120) such that the cropped image selection 124 may be displayed on the target device 120. The image crop evaluation component 192 may generate computer-executable instructions effective to cause the cropped image selection 124 (e.g., a cropped image candidate 110b) to be displayed on the target device 120.

Figure 2:
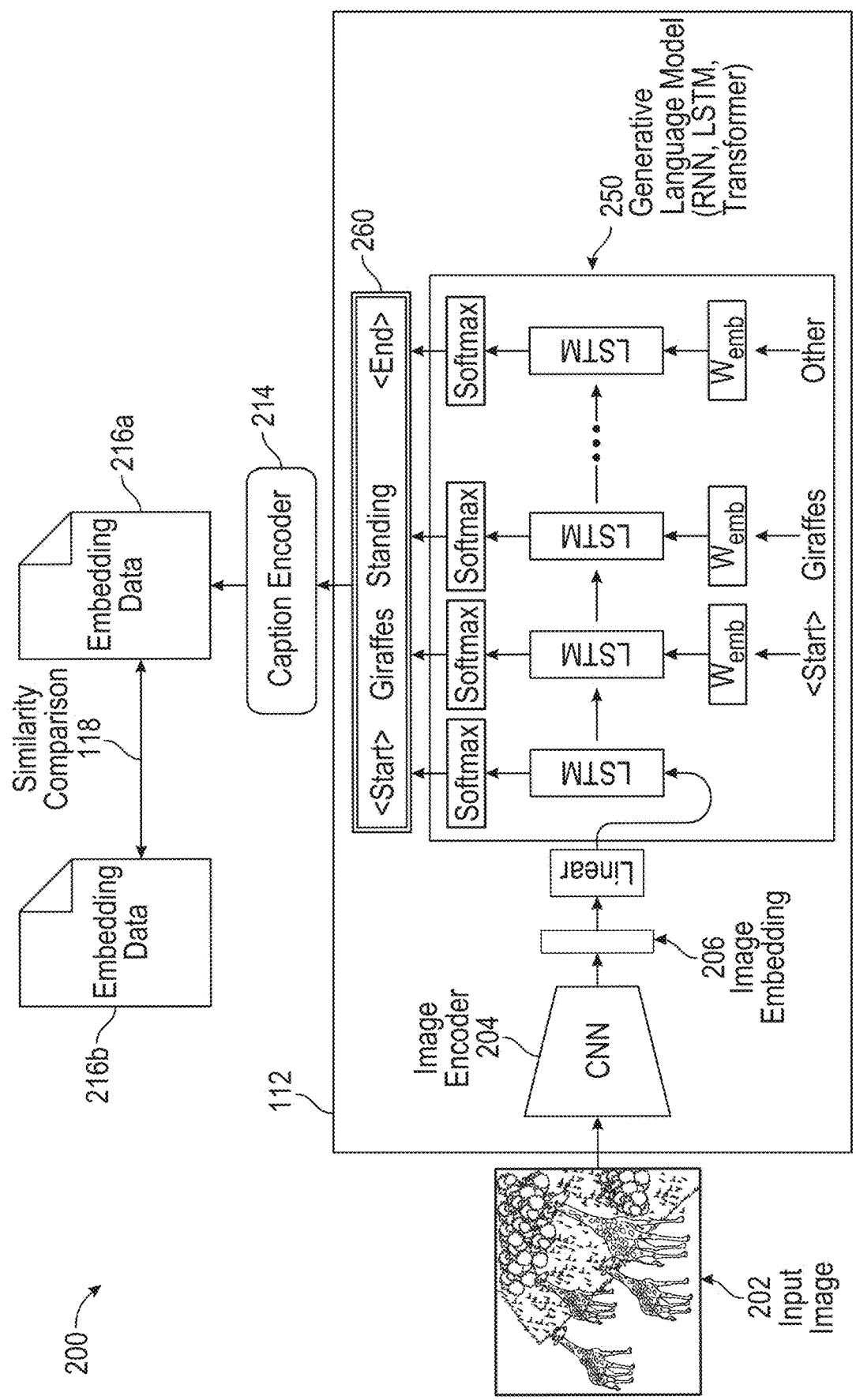
FIG. 2 is a block diagram illustrating an example system including details relating to an example image captioning model, in accordance with various aspects of the present disclosure.

FIG. 2 is a block diagram illustrating an example system 200 including additional details relating to an example image captioning model, in accordance with various aspects of the present disclosure. Image captioning refers to the machine learning task of taking an input image and automatically generating text that describes the content of the image (e.g., a description of the content). Image captioning systems can use an encoder-decoder framework, where an input image is encoded into an intermediate representation (e.g., an embedding) of the information in the image, and then can be decoded into a descriptive text sequence.

The image captioning model 200 in FIG. 2 is shown for illustrative purposes only. Any image captioning model may be used in accordance with the image crop evaluation component 192, as desired. In the example image captioning model 200, a convolutional neural network (CNN) is used as the image encoder 204. A CNN (such as ResNet) takes an image (e.g., input image 202) as input and uses one or more convolution operations wherein a filter kernel (e.g., an array of weight values) is slid over the image. For a given filter position, pixels (or a block of pixels depending on the layer and implementation) are multiplied by the values of the filter (element-wise multiplication). The multiplied values are summed to generate a single number for that receptive field of the filter (i.e., that position of the filter). The filter slides over the entire image and outputs an activation map that generally represents some image features. Earlier convolutional layers may represent low level image features such as edges, horizontal lines, etc., while subsequent convolutional layers (that take activation maps as input) may represent more and more complex image features (such as the presence of particular objects) to generate a representative value for that portion of the image (sometimes referred to as an image feature).

Convolutional layers of a CNN may be followed by pooling layers that downsample the activation map. For example, a pooling layer may apply a 2×2 filter that may slide over the activation map output by the preceding convolutional layer and output the maximum activation value from the activation map for the current pooling filter position (a process known as "max pooling"). Other pooling functions (e.g., average pooling, which takes the average value at a given pooling filter position) and other pooling filter sizes may be used, as desired. Any number of convolutional and pooling layers may be used, according to the desired implementation. In many examples, a fully connected layer may be used to perform some classification task. However, in the case of an image captioning model 200, the fully connected layer may be trained to present the output activation maps (sometimes referred to as "feature maps") in a form that is suitable for input into a decoder (e.g., a generative language model 250).

In the example in FIG. 2, image embedding 206 may be output by a fully connected layer of the image encoder 204. For example, the image embedding 206 may be a column vector of the output of the image encoder 204. Although, a CNN-based image encoder 204 is shown and described, various other encoders may be used. For example, visual transformer-based image encoders may be used which take into account other portions of the image when generating the encoded representation of a given portion of the image. As such, transformer-based image encoders may represent the context of a certain portion of the image based on other portions of the image using what is known as the "attention" mechanism. Still other examples of image encoders 204 may be used in accordance with the desired implementation (e.g., variational auto-encoders, etc.).

The image embedding 206 may be passed through a linear layer and may be input into the generative language model 250, which may be a decoder effective to transform the image embedding 206 into a natural language sequence (e.g., text) that describes the semantic content of the input image 202 (as represented in the image embedding 206). Various types of decoder networks are known and may be used in a given image captioning model. In the example, of FIG. 2, a long short term memory (LSTM) model is used to generate the text data 260 ("Giraffes standing") to describe the semantic content of the input image 202. However, other types of decoders may instead be used. For example, a recurrent neural network (RNN), a generative transformer (e.g., BERT) trained for the natural language generation task, etc.

In various examples, the image captioning model used as part of this process to evaluate the quality of image crops may vary markedly from the example image captioning model 200 shown in FIG. 2. For example, in some examples, the once-for-all (OFA) network may be used for the image captioning task.

Image captioning models may not be rotation invariant, meaning that the text of the models may differ if the input image is in portrait vs. landscape (or other) orientation. Accordingly, in some examples, the image crop evaluation component 192 may use a roll correction model that takes input images and predicts their rotation based on ground truth examples. For example, a pre-trained CNN (e.g, Resnet-18 or similar) may be finetuned to train such a roll correction model. The roll correction model may output the roll of an image. The image may thereafter be corrected by an angle that is the negative of the roll output by the roll correction model prior to passing the roll-corrected image to the image captioning model of the image crop evaluation component 192.

As previously described in reference to FIG. 1, the text data 260 may be encoded using an encoder. In FIG. 2, a caption encoder 214 that generates embeddings for input text is shown, although different encoders may be used for image crop quality evaluation depending on the desired implementation. Various example implementations of encoder 114 are described below in reference to FIGS. 3A-3D. The embedding data 216a generated for the cropped image candidate (e.g., input image 202) using the encoder 114 may be compared using a similarity comparison 118 with embedding data 216b representing the uncropped image. Embedding data 216b can be generated using the same image captioning model 200, another instance of the image captioning model 200, or similar variation of the image captioning model 200. Notably, using an image captioning model to first generate text that describes the content of the image may improve the quality evaluation of cropped images. The principle of operations is that if a cropped image maintains semantic fidelity (i.e., the most important aspects of the uncropped image from the perspective of an observer are present in the cropped image) with respect to the uncropped version of the image, the text which is generated using an image captioning model for both the uncropped image and the cropped image should be similar, since the text describes the content of the images. If the text changes drastically, it may be an indicator that the crop of the image has affected the semantic content of that image.

Figure 3A:
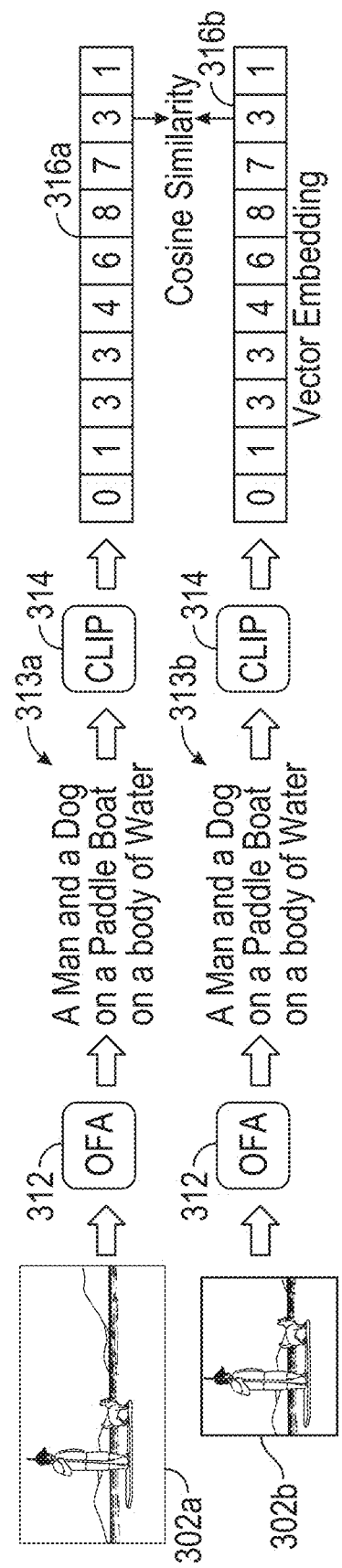
FIGS. 3A-3D depict various image cropping evaluation systems, in accordance with various aspects of the present disclosure.

FIGS. 3A-3D depict various image cropping evaluation systems, in accordance with various aspects of the present disclosure. FIG. 3A depicts an example implementation of image crop evaluation component 192. In the example shown in FIG. 3A, an uncropped image 302a and a candidate cropped image 302b (e.g., cropped from the uncropped image 302a) are each input into an image captioning model 312. In the example depicted in FIG. 3A, the image captioning model 312 is the OFA network. However, as previously described, any desired image captioning model may instead be used. The image captioning model 312 generates text 313a, 313b. Text 313a is the text generated by the image captioning model 312 representing the content of uncropped image 302a, while the text 313b is the text generated by the image captioning model 312 representing the content of candidate cropped image 302b. In the example depicted in FIG. 3A, the text 313a and 313b are identical.

Text 313a and 313b are each input into an encoder 314 to generate vector embeddings 316a, 316b. In the example of FIG. 3A, the encoder 314 is the constrastive language-image pre-training (CLIP) model is used to encode the input text into the embedding. However, as described in further detail below, other encoders may instead be used in accordance with the desired implementation. In the example depicted in FIG. 3A, since the input text 313a, 313b are identical, the vector embeddings 316a, 316b which are generated using the same encoder 314 are also identical. Accordingly, the cosine similarity of the two vector embeddings 316a, 316b is 1. However, in some examples, the candidate cropped image may cut out some salient portion of the uncropped image (e.g., such as removal of all of a portion of a person from the original, uncropped image in the cropped image). In such examples, the image captioning model 312 may generate text for the candidate cropped image that is different from the text generated by the image captioning model 312 for the uncropped image. Accordingly, the embeddings generated by the encoder 314 may also be different and the similarity score (e.g., computed using cosine similarity, Euclidean distance, a neural network, etc.) may be lower.

Figure 3B:
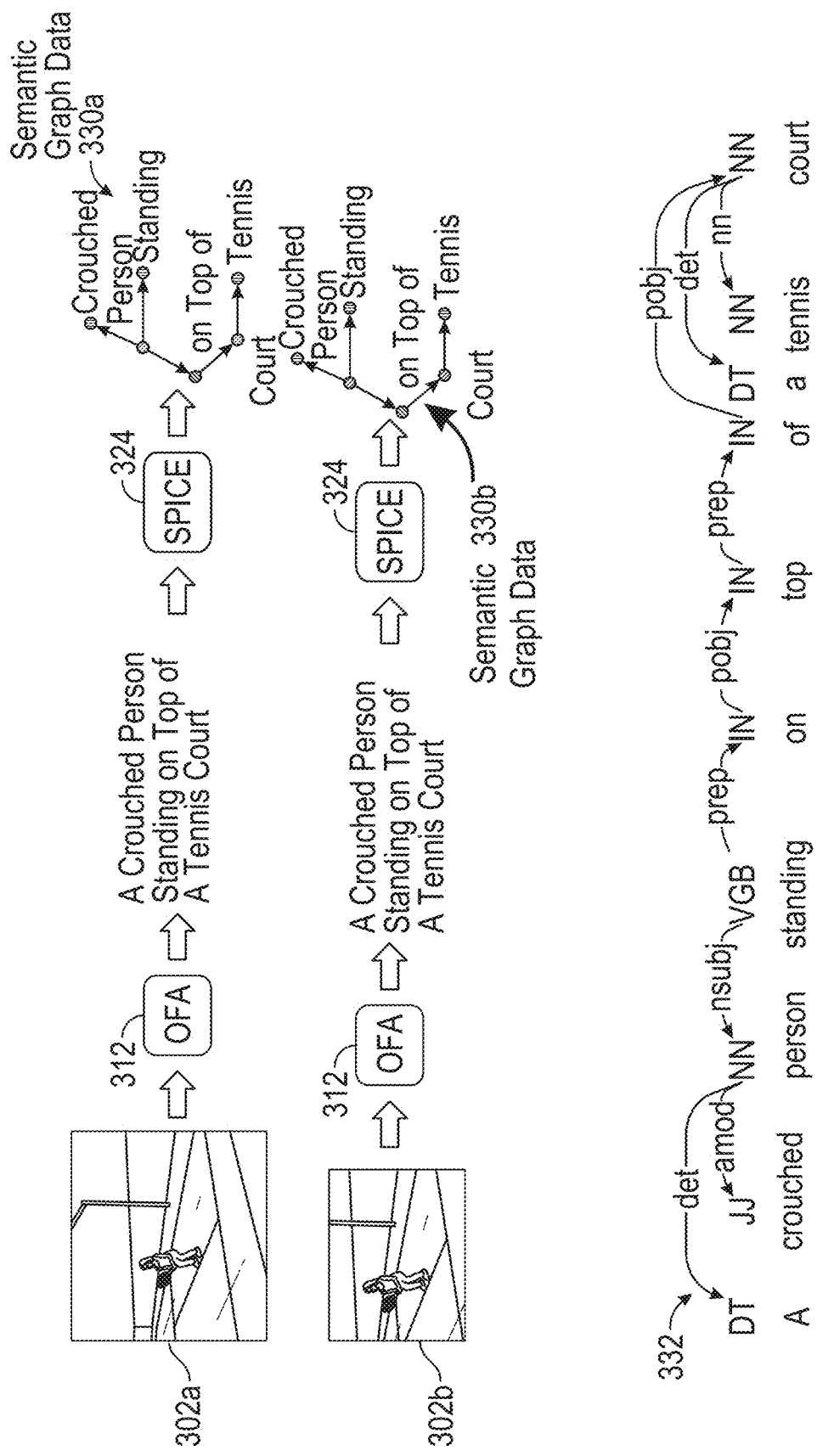

In the example shown in FIG. 3B, the encoder 314 is the Semantic Propositional Image Caption Evaluation (SPICE) encoder 324 is used to encode the image caption output by the image captioning model 312 into semantic graph data 330a, 330b.

The image captions (e.g., the text "A crouched person standing on top of a tennis court") output for both the uncropped image 302a and the candidate cropped image 302b may be transformed into a graph-based semantic representation referred to as semantic graph data (e.g., semantic graph data 330a, 330b). The semantic graph data explicitly encodes the objects, attributes, and relationships found in the image captions, while abstracting away lexical and syntactic idiosyncrasies of natural language.

In various examples, a two-stage approach may be used to parse an image caption into semantic graph data. In the first stage, syntactic dependencies between words in the caption are established using a dependency parser network that is pre-trained on a large dataset to generate a dependency syntax tree 332. In the second stage, the semantic graph data 330a, 330b is generated from the dependency tree 332 using a rule-based system. SPICE out-performs many n-gram metrics in terms of agreement with human evaluations of model-generated captions.

Figure 3C:
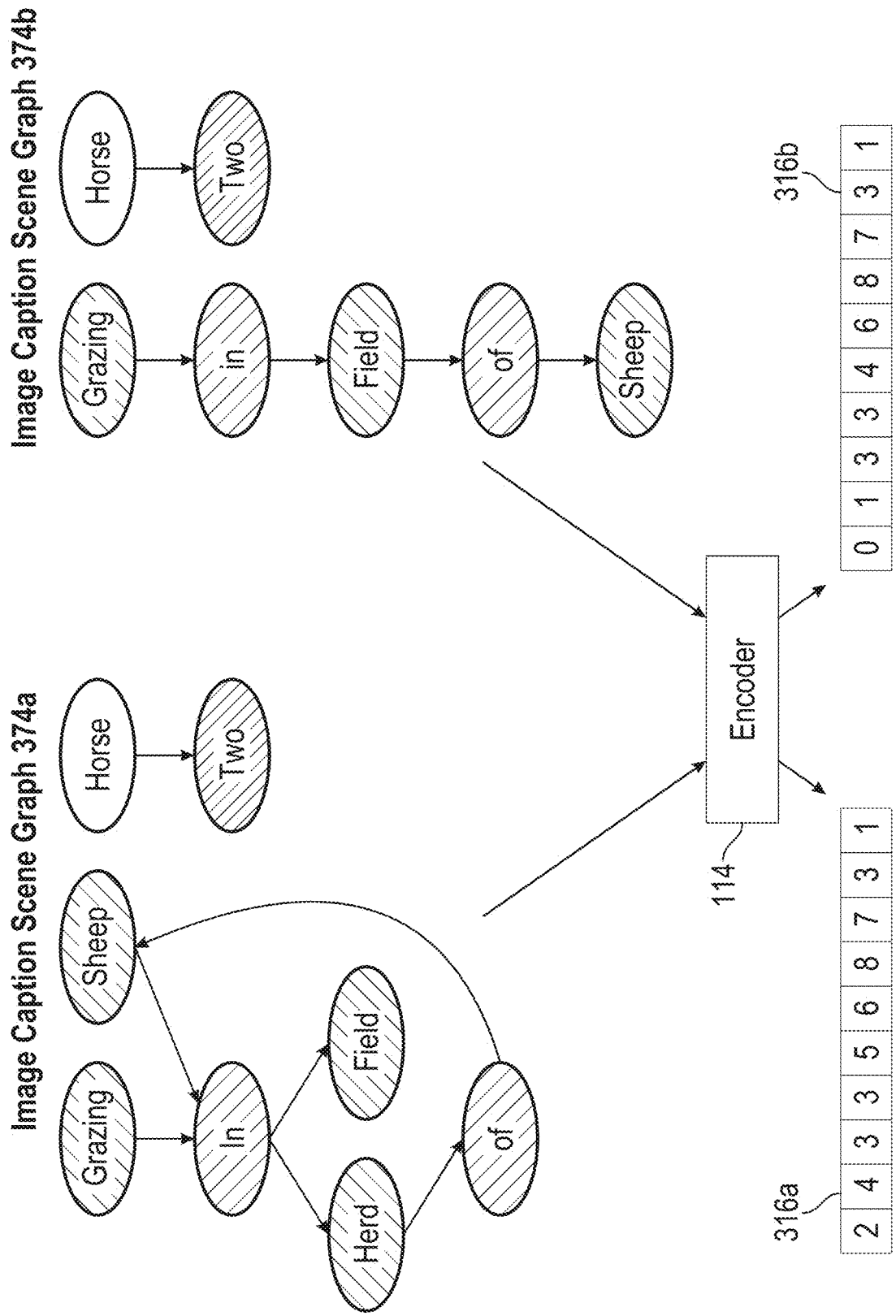

In the SPICE implementation of the image crop evaluation component 192, the similarity comparison 118 may be made between the semantic graph data 330a, 330b by determining if different nodes of the semantic graph data 330a and 330b match. FIG. 3C depicts a different implementation referred to as embedded SPICE. In embedded SPICE, instead of directly matching the nodes in the semantic graph data, which represent words in the image captions, the words are first converted to vectors (using any desired natural language encoder (e.g., Word2vec, CLIP, etc.) and the similarity between the semantic graphs is determined based on the similarity of such vectors. This provides a fuzzy matching capability over the example implementation shown in FIG. 3B, as instead of a binary classification in which a word for a given node either matches (1) or does not match (0), the semantic similarity of the nodes may be determined based on their proximity in the vector space. For example, each word may be represented as a vector using the selected natural language encoder (e.g., CLIP). A vector representing a word may be referred to as a "word embedding." A word embedding is a numerical representation that quantifies the linguistic and/or semantic information of the word. Word embeddings can be learned based on their distributional properties in large samples of language data (e.g., the training data for the natural language encoder). A distribution of such word embeddings may be referred to as the vector space. Each word embedding (e.g., each vector representing a word) in the vector space may be of the same number of dimensions. Since the word embedding can represent linguistic and semantic information about the word, words of similar meaning should be closer to one another in the n-dimensional vector space. Proximity between two word embeddings may be determined by calculating the Euclidean distance, cosine distance, cosine similarity, etc., between the two word embeddings (i.e., the two vectors).

For example, although the word "man" and "person" may be different words (and thus may result in a similarity value of 0 using traditional SPICE comparison techniques), the vector embeddings of "man" and "person" may be relatively similar in the vector space. Accordingly, an encoder 314 employing the embedded SPICE metric may more accurately compute semantic fidelity between image captions for uncropped and cropped images.

In another example, the image caption scene graph 374a includes the unigram "sheep." The image caption scene graph 374b also includes the unigram "sheep." The embeddings for these identical terms will match. Accordingly, the comparison of these two embeddings yields a maximum similarity score. In the example illustrated case, the image caption scene graph 374a includes the bi-gram "sheep in," while image caption scene graph 374b includes "sheep," but not the bi-gram "sheep in." The embedding for the bi-gram "sheep in" will be more similar to a bi-gram that includes "sheep" than a bi-gram that has no overlap. Accordingly, the similarity score for this comparison will reflect that there is some similarity, but that the embeddings are not identical. Accordingly, embedded SPICE may determine similarity between image caption text that may otherwise be discounted using non-embedded SPICE.

An example implementation for comparing scene graphs (e.g., the semantic graph data describing an image) using SPICE is discussed below, by way of example. However, there may be other ways to compare scene graphs (such as the embedded SPICE comparisons described above) which may be used in accordance with the present disclosure.

The task of parsing captions (e.g., text output by image captioning) to scene graphs may be defined as follows. Given a set of object classes C, a set of relation types R, a set of attribute types A, and a caption c, c may be parsed to a scene graph:

$$G(c) = \langle O(c), E(c), K(c) \rangle \quad (1)$$

where $O(c) \subseteq C$ is the set of object mentions in c, $E(c) \subseteq O(c) \times R \times O(c)$ is the set of hyper-edges representing relations between objects, and $K(c) \subseteq O(c) \times A$ is the set of attributes associated with objects. Note that in practice, C, R and A are open-world sets that are expanded as new object, relation and attribute types are identified, placing no restriction on the types of objects, relation and attributes that can be represented, including 'stuff' nouns such as grass, sky, etc. An example of a parsed scene graph is illustrated in FIG. 3B.

Note that the scene graph implementation does not represent multiple instances of a single class of object separately in the graph. Instead, object counts may be represented as attributes of objects (e.g., "two" for the object "horse" in image caption scene graphs 374a, 374b).

To complete this scene graph task, a probabilistic context-free grammar (PCFG) dependency parser may be followed by three post-processing steps that simplify quantificational modifiers, resolve pronouns and handle plural nouns. The resulting tree structure is then parsed according to nine simple linguistic rules to extract lemmatized objects, relations and attributes, which together comprise the scene graph. As an example, one of the linguistic rules captures adjectival modifiers, such as the crouched $\xleftarrow{amod}$ person example from FIG. 3B, which results in the object mention 'person' with attribute 'crouched'.

SPICE slightly modifies the other parsers by dropping the plural nouns transformation that duplicates individual nodes of the graph according to the value of their numeric modifier. Instead, numeric modifiers are encoded as object attributes. Second, SPICE adds an additional linguistic rule that ensures that nouns appear as objects in the scene graph-even if no associated relations can be identified. Disconnected nodes can be processed using the semantic proposition F-score calculation described below.

F-Score Calculation

To evaluate the similarity of candidate and reference scene graphs (e.g., the similarity of semantic graph data for an uncropped image and the semantic graph data for a candidate cropped image, such as that shown in FIG. 3B), the semantic relations in the scene graph may be viewed as a conjunction of logical propositions, or tuples. A function T that returns logical tuples from a scene graph may be defined as:

$$T(G(c))T(G(c)) \triangleq O(c) \cup E(c) \cup K(c) \qquad (2)$$

Each tuple contains either one, two or three elements, representing objects, attributes and relations, respectively. For example, the scene graph in FIG. 3B would be represented with the following tuples:

{(person), (court), (person, crouched), (person, standing) (court, tennis), (person, on-top-of, court)}

Viewing the semantic propositions in the scene graph as a set of tuples, the binary matching operator ⊗ may be defined as the function that returns matching tuples in two scene graphs. Precision P, recall R, and SPICE may be defined as:

$$P(c, S) = \frac{|T(G(c)) \otimes T(G(S))|}{|T(G(c))|} \qquad (3)$$

$$R(c, S) = \frac{|T(G(c)) \otimes T(G(S))|}{|T(G(S))|} \qquad (4)$$

$$\text{SPICE}(c, S) = F_1(c, S) = \frac{2 \cdot P(c, S) \cdot R(c, S)}{P(c, S) + R(c, S)} \qquad (5)$$

where for matching tuples, the wordnet synonym matching approach of METEOR may be used, such that tuples are considered to be matched if their lemmatized word forms are equal—allowing terms with different inflectional forms to match—or if they are found in the same wordnet sysnet.

Unlike some other approaches, no allowance is made for partial credit when only one element of a tuple is incorrect using traditional SPICE. In the domain of image captions, many relations (such as in and on) are so common they could be given no credit when applied to the wrong objects.

Being an F-score, SPICE is interpretable as it is naturally bounded between 0 and 1. Unlike CIDEr, SPICE does not use cross-dataset statistics—such as corpus word frequencies—and is therefore equally applicable to both small and large datasets. However, as described above, the embeddings for unigrams and bigrams in semantic graph data may be determined and the comparisons may be made using these embeddings instead of the binary matching used in traditional SPICE using the embedded SPICE approach described in reference to FIG. 3C.

Figure 3D:
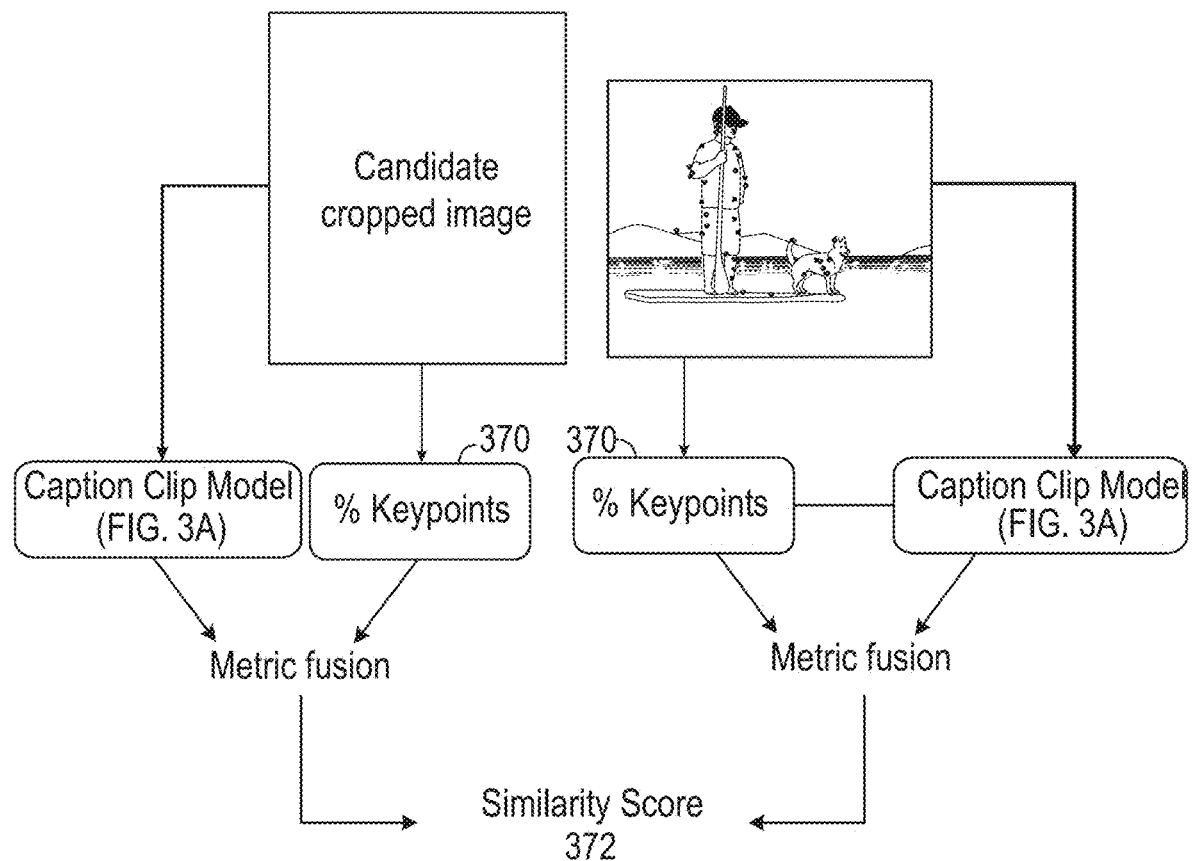

FIG. 3D depicts an example implementation of encoder 114 (of FIG. 1) using a keypoint detector in accordance with various examples described herein. A keypoint detector may use various computer vision techniques (e.g., a CNN and/or the visual transformers described above) to detect keypoints in an image. Keypoints may be different spatial points in the image that define the subject of the content of the image (e.g., the interesting points and/or things that stand out in the image). Keypoint detectors can be trained using annotated images that define ground truth keypoints (e.g., points on a face of a person identifying the eyes, nose, mouth, etc.). After training, a keypoint detector may detect the keypoints in a previously-unseen image. Any desired keypoint detector may be used, in accordance with the desired implementation. In the example of FIG. 3D, the percentage of keypoints 370 may be determined using a ratio of the number of keypoints detected in the uncropped image data to the number of keypoints detected in the cropped image data. In general, higher percentages of keypoints may indicate that the cropped image has a higher degree of semantic fidelity with respect to the uncropped image. In the example, depicted in FIG. 3D, the percentage of keypoints 370 may be combined with the similarity score generated by the caption CLIP model (e.g., a model using the architecture of FIG. 3A). For example, a heuristic and/or a fully-connected layer may take the similarity score output by the model in FIG. 3A and the keypoint percentage as inputs and may generate a fused metric score representing a quality of the crop. The fused metric score for an uncropped image and a candidate cropped image may be generated by fusing the score output by the caption clip model and the percentage of keypoints 730. The two fused metric scores may thereafter be compared (e.g., using cosine similarity) to determine similarity score 372 indicating a quality of the candidate cropped image. It should be noted that other image comparison mechanisms apart from keypoint percentages may be used in combination with caption similarity scoring (using any desired weighting mechanism for the individual scores and/or any desired fusion mechanism for the individual scores) in order to generate similarity score 372. Another example technique for determining a similarity between an uncropped image and a candidate cropped image may be to generate image embeddings (e.g., using a CNN, visual transformer, etc.) and to determine a similarity score between the image embeddings (e.g., using cosine similarity). This similarity score may be combined with the similarity score generated using the caption CLIP model or other caption-based similarity model and fused as described above to generate similarity score 372.

Figure 4A:
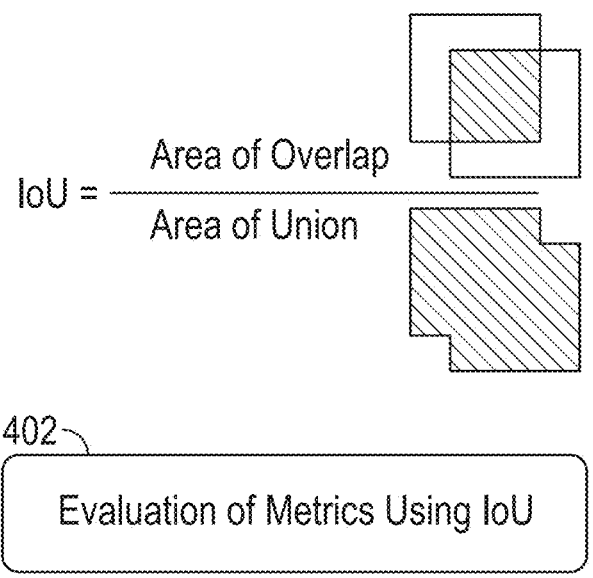
FIG. 4A is diagram describing an intersection over union metric for evaluating the different image cropping systems of FIGS. 3A-3D, in accordance with various aspects of the present disclosure.

FIG. 4A is diagram describing an intersection over union (IoU) metric for evaluating the different image cropping systems of FIGS. 3A-3D, in accordance with various aspects of the present disclosure. In this case, IoU specifies the amount of overlap between pixels a bounding box defining a candidate crop image and a ground truth bounding box representing the ideal crop for that image. Both bounding boxes may be of the same size (according to the desired output aspect ratio). An IoU of 1 means that the candidate crop is the same as the ground truth candidate crop, while an IoU of 0 means that there is no overlap between the two boxes. The IoU metric may be used to evaluate (at action 402) the various cropping evaluation systems described above in reference to FIGS. 3A-3D. The intuition may be that if a particular candidate crop has a high IoU value (e.g., the candidate crop corresponds closely to the ground truth candidate crop), then the candidate crop should also have a high semantic similarity score (generated using image crop evaluation component 192). Conversely, if a particular candidate crop has a low IoU value (e.g., the candidate crop has little overlap with the ground truth candidate crop), then the candidate crop should have a low semantic similarity score (generated using image crop evaluation component 192).

Figure 4B:
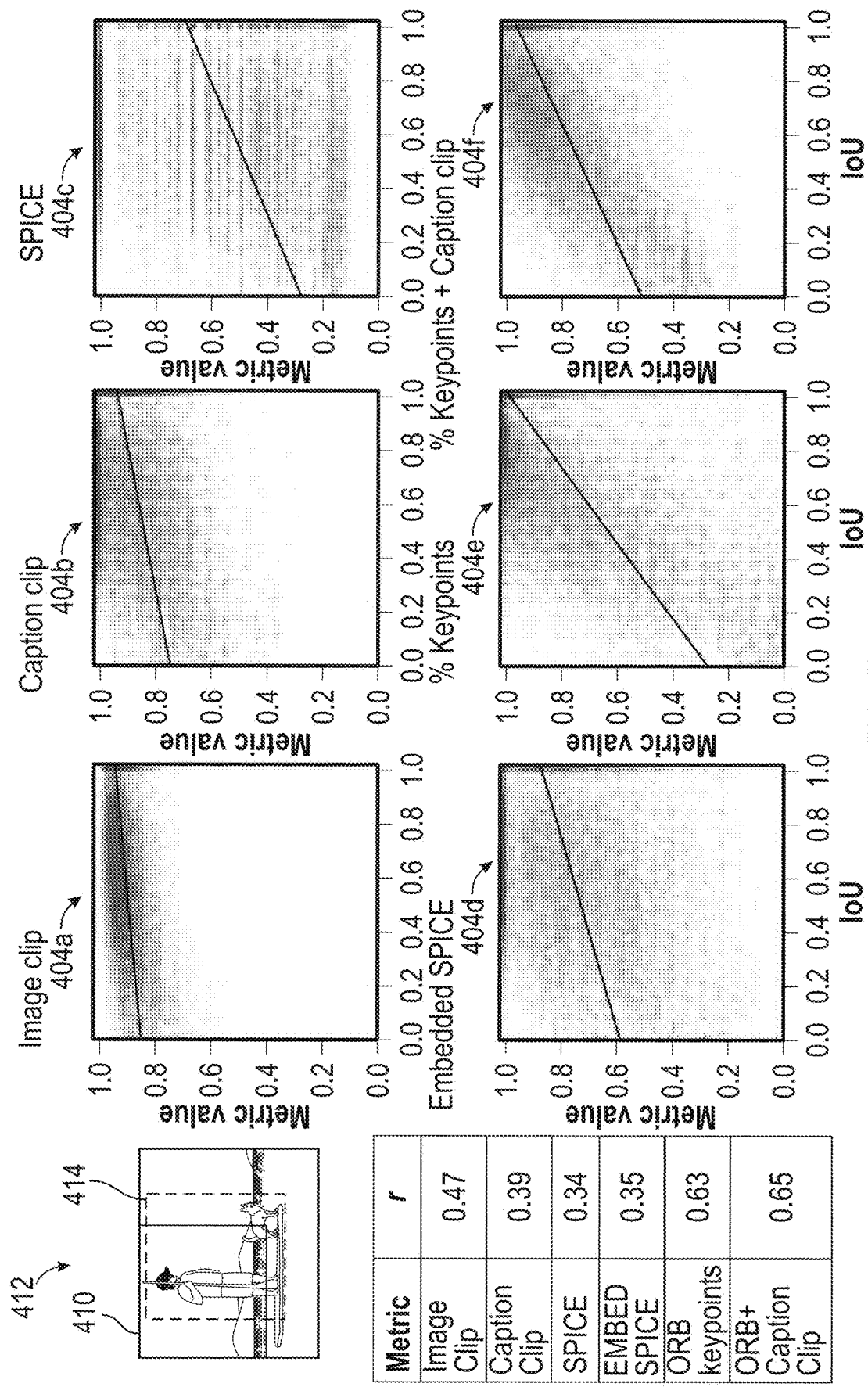
FIG. 4B depicts various plots of image cropping evaluation scores vs. intersection over union scores for various image cropping evaluation systems, in accordance with various aspects of the present disclosure.

FIG. 4B depicts various plots of image cropping evaluation scores vs. intersection over union scores for various image cropping evaluation systems, in accordance with various aspects of the present disclosure. FIG. 4B plots the metric value of six different crop evaluation metrics on the y-axis vs. the IoU value on the x-axis. Intuitively, the metric score for a given metric should be low when the IoU is low and high when the IoU is high. Additionally, all points should lie on a line with positive slope. The different metric scores generated by different implementations of the image crop evaluation component 192 may be generated by sliding a bounding box 410 (of the desired crop size) over input image 412. The IoU scores may be generated by comparing the overlap of the bounding box 410 with the ground truth bounding box 414. The Pearson rank coefficient r is used to measure the linearity between two variables with a higher rank coefficient r indicating better metric performance.

Image clip 404a represents a metric where an image embedding for the candidate cropped image is compared against the image embedding for the uncropped image (e.g., without using an image captioning model). Caption clip 404b represents the implementation of image crop evaluation component 192 depicted in FIG. 3A. SPICE 404c represents the implementation of image crop evaluation component 192 depicted in FIG. 3B. Embedded SPICE 404d represents the implementation of image crop evaluation component 192 depicted in FIG. 3C. Percentage keypoints 404e represents a metric that measures only the percentage keypoints (e.g., % keypoints 370 described in reference to FIG. 3D). In the example of FIG. 4B, the keypoint detection model used is the oriented fast and rotated brief (ORB) keypoint detection model. However, any desired keypoint detection model may be used in accordance with the desired implementation. Percentage keypoints and caption clip 404f represents an implementation of image crop evaluation component 192 depicted in FIG. 3D in which keypoint detection and caption clip are combined to generate a metric score of the overall crop quality.

As described in further detail below, the various metrics used by the image crop evaluation component 192 may be used to implement an auto-cropping system that automatically crops images according to a desired aspect ratio and which generates a crop that maximizes semantic fidelity with respect to the original, uncropped image using the various metrics of the image crop evaluation component 192 described herein.

Figure 5:
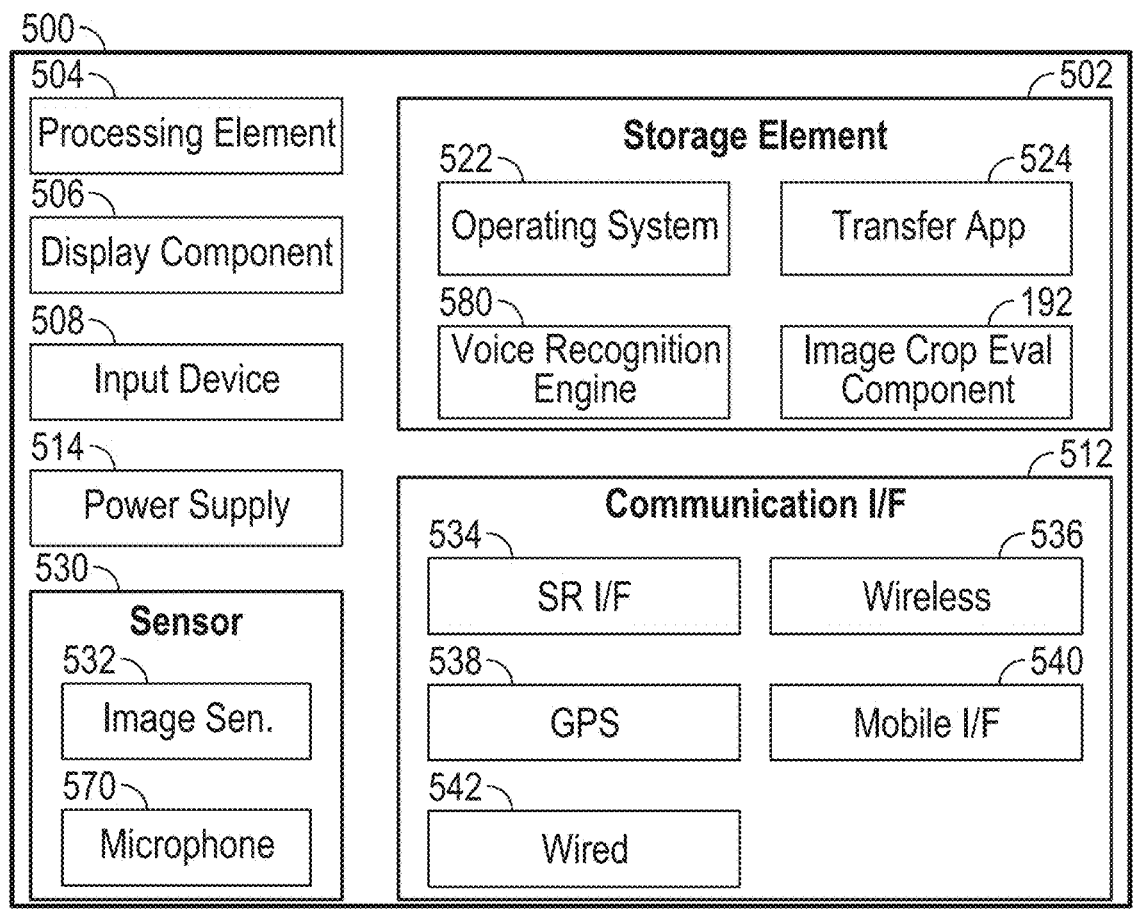
FIG. 5 depicts an example architecture of a computing device that may be used in accordance with various aspects of the present disclosure.

FIG. 5 is a block diagram showing an example architecture 500 of a computing device, such as the processors and other computing devices described herein. It will be appreciated that not all user devices will include all of the components of the architecture 500 and some user devices may include additional components not shown in the architecture 500. The architecture 500 may include one or more processing elements 504 for executing instructions and retrieving data stored in a non-transitory computer-readable storage element 502. The processing element 504 may comprise at least one processor. Any suitable processor or processors may be used. For example, the processing element 504 may comprise one or more digital signal processors (DSPs) and/or image signal processors (ISPs). The storage element 502 can include one or more different types of non-transitory, computer-readable memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the user device and may facilitate communications and commands between applications executing on the architecture 500 and various hardware thereof. A transfer application 524 may be configured to receive data from another device or from an integrated device (e.g., image sensor 532) included in the architecture 500. The storage element 502 may store instructions that may be used to implement the image crop evaluation component 192 including the various machine learning encoders and decoders used to evaluate the semantic fidelity of a candidate image crop, as described above.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 for capturing sounds, such as voice commands. Voice recognition engine 580 may interpret audio signals of sound captured by microphone 570. In some examples, voice recognition engine 580 may listen for a "wake word" to be received by microphone 570. Upon receipt of the wake word, voice recognition engine 580 may stream audio to a voice recognition server for analysis. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through plug-in approaches, or through other approaches such as capacitive or inductive charging.

The communication interface 512 may comprise one or more wired or wireless components operable to communicate with one or more other user devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol. In various examples where architecture 500 represents computing device(s) 102 (shown in FIG. 1), mobile interface 540 may allow computing device(s) 102 to communicate with one or more other computing devices.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output.

In some examples, the GPS interface 538 may be utilized as a motion sensor. For example, changes in the position of the architecture 500, as determined by the GPS interface 538, may indicate the motion of the GPS interface 538.

Figure 6:
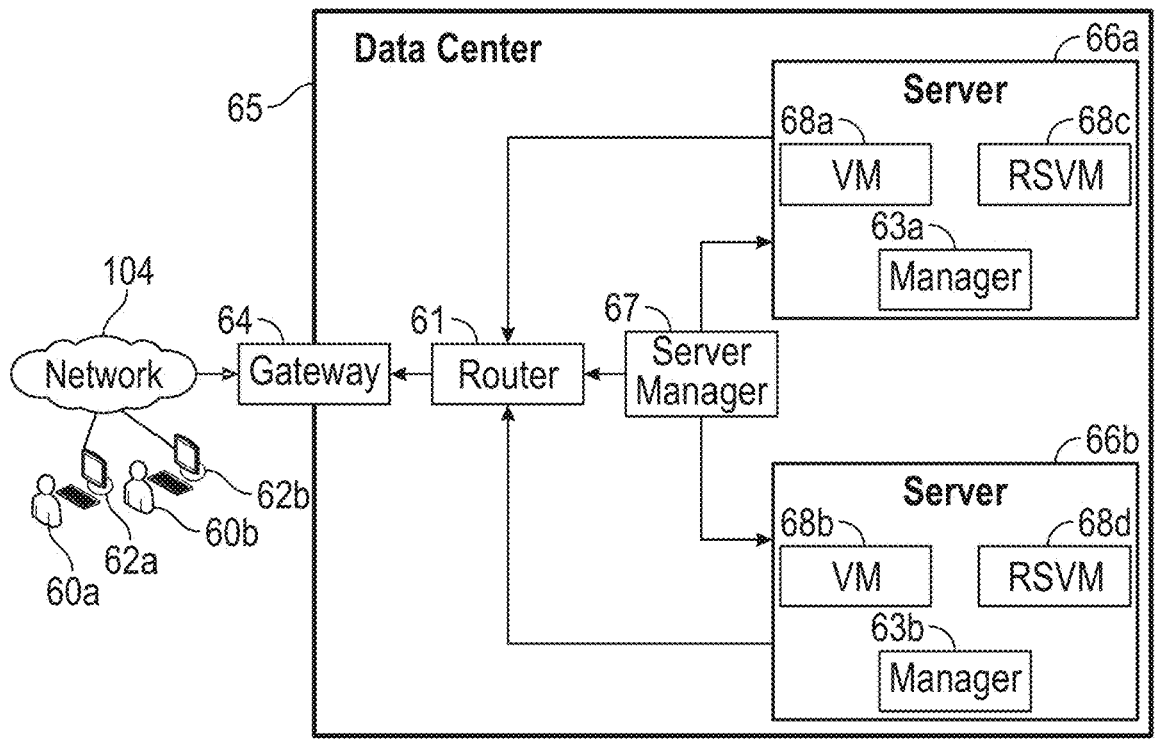
FIG. 6 is a diagram illustrating an example system for sending and providing data that may be used in accordance with the present disclosure.

An example system for sending and providing data and performing various computer-implemented processes will now be described in detail. In particular, FIG. 6 illustrates an example computing environment in which the embodiments described herein may be implemented. For example, the computing environment of FIG. 6 may be used to provide automatic image cropping and/or cropping quality evaluation a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the computing device(s) 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
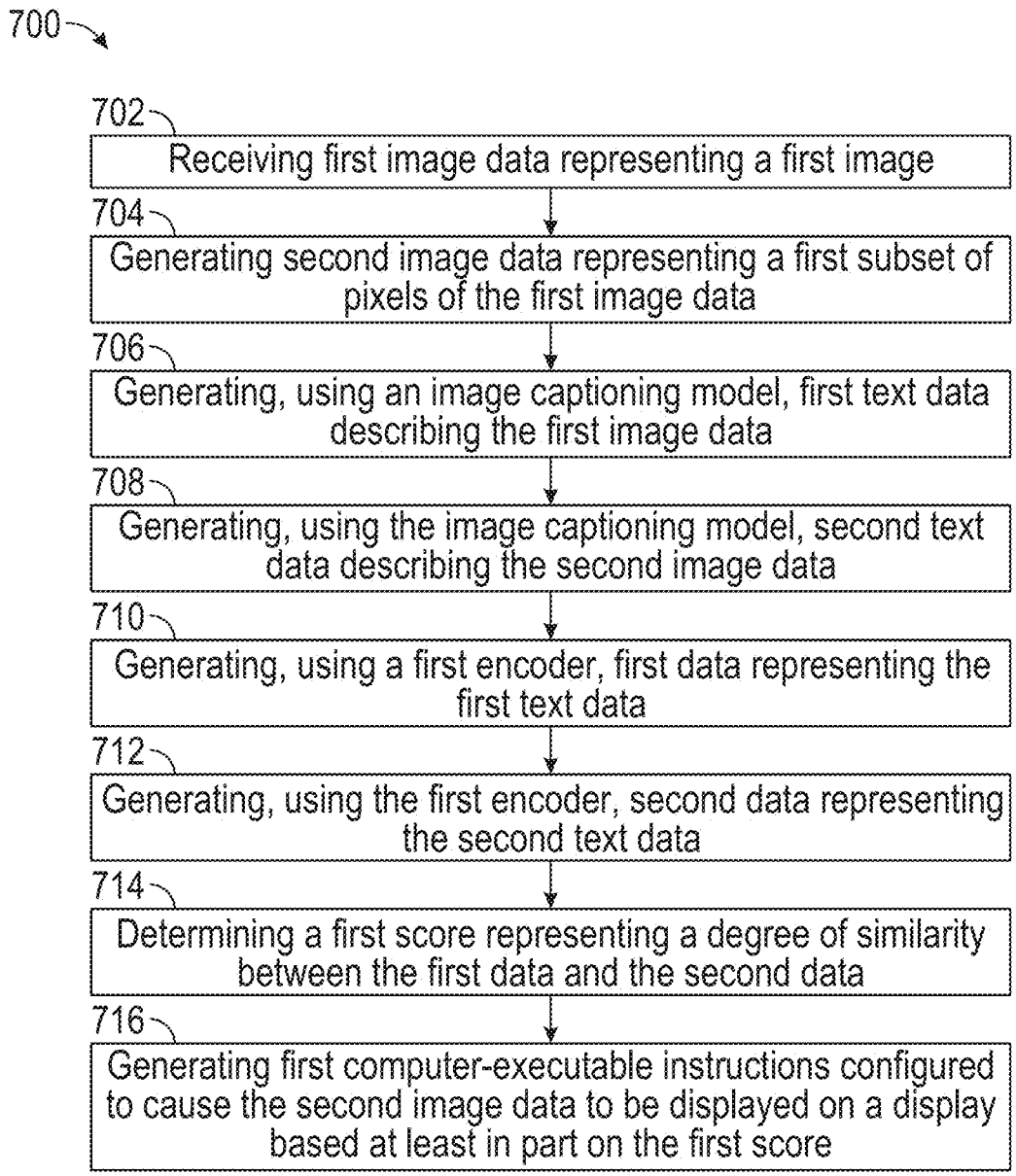
FIG. 7 is a flow chart illustrating an example process for generating a cropped image, in accordance with various aspects of the present disclosure.

FIG. 7 is a flow chart illustrating an example process 700 for generating a cropped image, in accordance with various aspects of the present disclosure. The process 700 of FIG. 7 may be executed by computing device(s) 102 and/or by a combination of computing device(s) 102 and one or more other computing devices. The actions of process 700 represent a series of instructions comprising computer-readable machine code executable by a processing unit of a computing device. In various examples, the computer-readable machine code is comprised of instructions selected from a native instruction set of the computing device and/or an operating system of the computing device. Various actions in process 700 are described above with reference to elements of FIGS. 1-6.

Processing begins at action 702, at which first image data representing a first image may be received. For example, the first image data may be an uncropped image having a first aspect ratio. However, there may be a request to send the first image data to a second device (e.g., a target device) that has a different aspect ratio and/or to a browser application or other application on the target device that supports a different aspect ratio.

Processing may continue at action 704, at which second image data may be generated that represents a subset of pixels of the first image data. For example, the second image data may be a candidate cropped image. The cropping may be performed in a variety of ways. For example, a bounding box that is of an aspect ratio of the target device/target aspect ratio may be iterated across all possible positions or at any stride in the first image data to generate candidate crops of the first image. In another example, object detectors and/or keypoint detectors may be used to select a candidate crop of the first image data. In any case, the various actions described herein may be used to evaluate the quality of the candidate cropped image data (e.g., the second image data) in terms of its semantic fidelity to the original, uncropped image (e.g., the first image data). The sending and/or displaying of the cropped image may be dependent on the evaluation of the quality of the cropped image.

Processing may continue to action 706, at which an image captioning model may be used to generate first text data describing content of the first image data. As described above in reference to FIG. 2, for example, an image captioning model may take the first image data as input and may generate text that describes the content of the first image data. At action 708, the image captioning model may also be used to generate second text data that describes the content of the second image data. Since the second image data is a subset of the first image data, the second text data may differ, in some cases, from the first text data depending on the quality of the cropping. In cases where multiple candidate crops are evaluated, the process can iterate through actions 704 to 714 for each candidate.

Processing may continue to action 710, at which a first encoder (e.g., encoder 114) may be used to generate first data representing the first text data. The first data may be an embedding (e.g., a vector) that represents the first text data in a multi-dimensional space. Various example encoders are described herein. For example, SPICE may be used as an encoder to generate semantic graph data representing the first text data. Similarly, embedded SPICE may generate semantic graph data, but may replace the word representations (nodes) of the semantic graph data with vector embeddings representing the words to account for semantic similarity. In another example, CLIP or another natural language encoder may be used to encode the text data into a numerical vector for similarity comparison. In yet other examples, the text may be embedded using caption CLIP (e.g., FIG. 3A) while the image may be embedded using a keypoint detector (e.g., ORB) and the outputs may be combined (e.g., using a fully connected layer) to generate an embedding representing both the input text and the input image. At action 712, the same encoder (implemented using any of the various techniques described herein) may be used to generate second data that represents the second text data (e.g., the text data generated at action 708 representing the candidate cropped image).

Processing may continue at action 714, at which a first score (e.g., data) may be generated that represents a degree of similarity between the first data and the second data. For example, the first data and the second data may be respective embedding vectors. Accordingly, a cosine similarity and/or a Euclidean distance may be used to determine the similarity between the two embedding vectors. The cosine similarity and/or the Euclidean distance may be output as the first score. In various examples, multiple scores may be generated for the candidate cropped image (e.g., the second image data) with each score being generated for a different metric among the various candidate crop quality evaluation metrics described herein. The various scores may be input into a neural network or other machine learning model to generate an overall score for the candidate crop. In various examples, the model that may fuse the various scores may be a logistic regression model, regression trees, multi-layer perceptron (MLLP), etc., depending on the desired implementation. The score (or scores) for the candidate crop may be compared to the scores for all other candidate crops to select the highest scoring candidate crop for output by the target device. In another example, the score (or scores) may be compared to a threshold score that has been empirically tuned. If the score exceeds the threshold score, the candidate crop may be sent to the target device for display. In various examples, using such a threshold may conserve compute resources as no further candidate crops need be generated after a candidate crop has met or exceeded the threshold similarity score. In other examples where multiple candidates are evaluated and a score generated for each candidate crop, the candidate crop with the best score indicating the highest semantic fidelity to the uncropped image is selected for further use.

Processing may continue to action 716, at which first computer-executable instructions may be generated. The first computer-executable instructions may be configured to cause the second or selected candidate image data to be displayed on a display based at least in part on the first score. The second or selected candidate image data may be cropped according to an aspect ratio of the display of the target device. The candidate quality evaluation and cropping may be performed in real time without requiring any manual cropping or evaluation, thereby allowing images to be passed between different displays in real-time and displayed using different aspect ratios without distorting the image or waiting for the images to be cropped.

Figure 8:
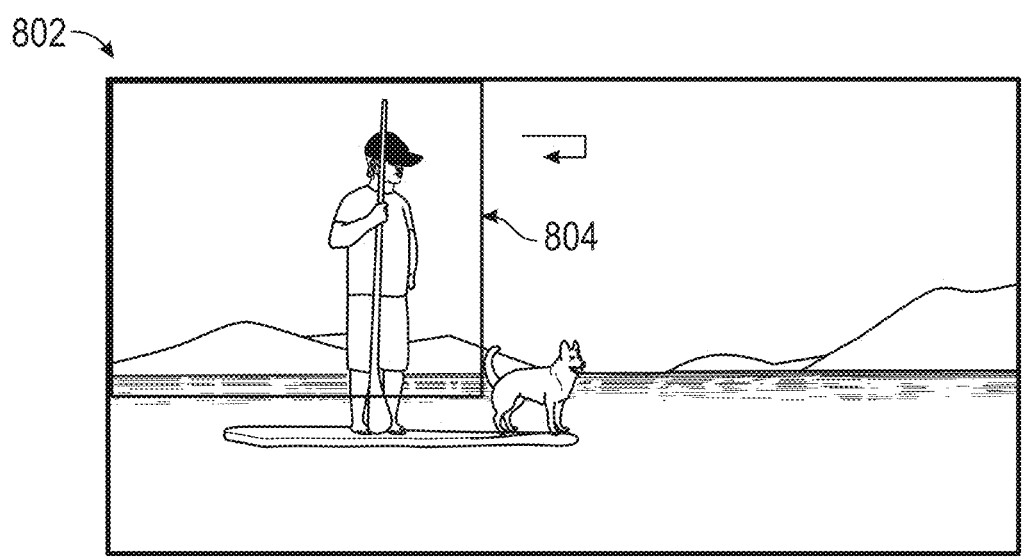
FIG. 8 describes an automatic cropping component that may be used in accordance with various aspects of the present disclosure.

FIG. 8 describes an automatic cropping component that may be used in accordance with various aspects of the present disclosure. In various examples, an input image 802 and a target aspect ratio may be input into the automatic cropping component. The input image 802 and the target aspect ratio may be programmatically input into the automatic cropping component using an application programming interface of the automatic cropping component. The automatic cropping component may generate a polygon (e.g., a sliding window 804) of the input aspect ratio. Thereafter, the sliding window 804 may be iterated over a desired number of positions (e.g., moving one row and/or column of pixels at a time or multiple rows and/or columns of pixels at a time, depending on the implementation) in the input image 802 and a candidate crop defined by the current position of the sliding window 804 may be generated. The sliding window may be moved over the input image 802 using any desired stride. A higher stride may be less computationally intensive and may reduce latency. However, a smaller stride may generate higher quality crops at the expense of computational resources consumed and/or latency. The candidate crop may be evaluated with respect to the input image 802 using one or more of the various image crop quality evaluation metrics described herein. The different candidate image crops may be evaluated and/or compared to one another using the output scores. In a simplistic implementation, the candidate crop with the highest overall score or highest average score may be selected and sent for display.

In some cases, such an automatic cropping component that generates a candidate crop for each possible position of the sliding window 804 may be prohibitively expensive in terms of latency and/or computational cost. Accordingly, in various examples, an object detector and/or keypoint detector may be used to limit the number of positions of the sliding window 804 to positions which include, for example, at least a certain number or percentage of keypoints or at least one recognized object. In this way, the computational burden of such an automatic cropping component is reduced.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
    receiving first image data representing a first image;
    generating second image data representing a portion of the first image that is generated by cropping the first image data according to a first aspect ratio of a first display of a target device;
    generating, by inputting the first image data into an image captioning model, first text data representing a first description of first content of the first image data;
    generating, using a first encoder, a first vector representation of the first text data;
    generating, by inputting the second image data into the image captioning model, second text data representing a second description of second content of the second image data;
    generating, using the first encoder, a second vector representation of the second text data;
    determining a first cosine similarity score between the first vector representation and the second vector representation; and
    generating, based at least in part on the first cosine similarity score, first computer-executable instructions to cause the second image data to be displayed on the first display of the target device.

2. The computer-implemented method of claim 1, further comprising:
    generating first graph data representing the first text data using a semantic propositional image caption evaluation (SPICE) model, wherein a node in the first graph data represents a word of the first text data; and
    generating second graph data representing the second text data using SPICE.

3. The computer-implemented method of claim 2, further comprising:
    generating, by the first encoder, the first vector representation at least in part by generating a first embedding for a first node in the first graph data, the first node representing a first word;
    generating, by the first encoder, the second vector representation at least in part by generating a second embedding for a second node in the second graph data, the second node representing a second word; and
    determining the first cosine similarity score based at least in part by determining a cosine similarity between the first embedding and the second embedding.

4. A method comprising:
    receiving first image data representing a first image;
    receiving second image data representing a second image comprising a first subset of pixels of the first image data;
    generating, using an image captioning model executed by at least one computing device, first text data describing the first image;
    generating, using the image captioning model, second text data describing the second image;
    generating first data representing the first text data;
    generating second data representing the second text data;
    determining a third data representing a degree of similarity between the first data and the second data; and
    generating first computer-executable instructions configured to cause the second image data to be displayed on a display based at least in part on the third data.

5. The method of claim 4, further comprising:
    generating first graph data representing the first text data, wherein a first node in the first graph data represents a first word of the first text data, wherein the first data comprises the first graph data; and
    generating second graph data representing the second text data, wherein the second data comprises the second graph data.

6. The method of claim 5, further comprising:
    determining, using the first graph data and the second graph data, a first set of words present in the first graph data that are also present in the second graph data; and
    generating the third data based at least in part on the first set of words.

7. The method of claim 5, further comprising:
    generating a first vector representing at least a first word in the first graph data, wherein the first data comprises the first vector;
    generating a second vector representing at least a second word in the second graph data, wherein the second data comprises the second vector; and
    determining the third data based at least in part on one of a cosine similarity or Euclidean distance between the first vector and the second vector.

8. The method of claim 4, further comprising:
determining first keypoints in the first image data using a keypoint detection model;
determining second keypoints in the second image data using the keypoint detection model;
determining a ratio of a number of the second keypoints to a number of the first keypoints; and
determining the third data based at least in part on the ratio.

9. The method of claim 4, further comprising:
receiving third image data representing a third image comprising a second subset of pixels of the first image data different from the first subset;
generating, using the image captioning model, third text data describing the third image data;
generating, using a first encoder and the third text data, fourth data representing the third text data;
determining fifth data representing a degree of similarity between the first data and the fourth data; and
selecting the second image data for output based on a comparison of the third data and the fifth data.

10. The method of claim 4, wherein the first data and the second data are generated using a first encoder, the method further comprising:
generating, using a second encoder executed by the at least one computing device, fourth data representing the first text data;
generating, using the second encoder and the second text data, fifth data representing the second text data;
determining sixth data representing a degree of similarity between the fourth data and the fifth data;
inputting the third data and the sixth data into a neural network; and
generating, by the neural network, output data indicating a semantic similarity between the first image data and the second image data.

11. The method of claim 4, further comprising:
receiving a first input describing a first aspect ratio of an output display;
generating a plurality of cropped images from the first image data by iterating a window of the first aspect ratio over a plurality of positions overlaying the first image data, wherein each position of the plurality of positions corresponds to one of the plurality of cropped images;
generating, for a first cropped image of the plurality of cropped images, a first score representing a first degree of similarity between the first cropped image and the first image;
generating, for a second cropped image of the plurality of cropped images, a second score representing a second degree of similarity between the second cropped image and the first image; and
selecting the first cropped image from among the plurality of cropped images based on the first score and the second score.

12. The method of claim 4, wherein the third data represents a similarity between first content of the first image and second content of the second image.

13. A system comprising:
at least one processor; and
at least one non-transitory computer-readable memory storing instructions that, when executed by the at least one processor, are effective to program the at least one processor to:
receive first image data representing a first image;
receive second image data representing a second image comprising a first subset of pixels of the first image;
generate, using an image captioning model executed by at least one computing device, first text data describing the first image;
generate, using the image captioning model, second text data describing the second image;
generate first data representing the first text data;
generate second data representing the second text data;
determine a third data representing a degree of similarity between the first data and the second data; and
generate first computer-executable instructions configured to cause the second image data to be displayed on a display based at least in part on the third data.

14. The system of claim 13, the at least one non-transitory computer-readable memory storing further instructions that, when executed by the at least one processor, are further effective to program the at least one processor to:
generate first graph data representing the first text data, wherein a first node in the first graph data represents a first word of the first text data, wherein the first data comprises the first graph data; and
generate second graph data representing the second text data, wherein the second data comprises the second graph data.

15. The system of claim 14, the at least one non-transitory computer-readable memory storing further instructions that, when executed by the at least one processor, are further effective to program the at least one processor to:
determine, using the first graph data and the second graph data, a first set of words present in the first graph data that are also present in the second graph data; and
generate the third data based at least in part on the first set of words.

16. The system of claim 14, the at least one non-transitory computer-readable memory storing further instructions that, when executed by the at least one processor, are further effective to program the at least one processor to:
generate a first vector representing at least a first word in the first graph data, wherein the first data comprises the first vector;
generate a second vector representing at least a second word in the second graph data, wherein the second data comprises the second vector; and
determine the third data based at least in part on a cosine similarity or Euclidean distance between the first vector and the second vector.

17. The system of claim 13, the at least one non-transitory computer-readable memory storing further instructions that, when executed by the at least one processor, are further effective to program the at least one processor to:
receive a first input describing a first aspect ratio of an output display;
generate a plurality of cropped images from the first image data by iterating a window of the first aspect ratio over a plurality of positions overlaying the first image data, wherein each position of the plurality of positions corresponds to one of the plurality of cropped images;
generate, for a first cropped image of the plurality of cropped images, a first score representing a first degree of similarity between the first cropped image and the first image;

generate, for a second cropped image of the plurality of cropped images, a second score representing a second degree of similarity between the second cropped image and the first image; and select the first cropped image from among the plurality of cropped images based on the first score and the second score.

18. The system of claim 13, the at least one non-transitory computer-readable memory storing further instructions that, when executed by the at least one processor, are further effective to program the at least one processor to:

determine first keypoints in the first image data using a keypoint detection model;

determine second keypoints in the second image data using the keypoint detection model;

determine a ratio of a number of the second keypoints to a number of the first keypoints; and determine the third data based at least in part on the ratio.

19. The system of claim 13, the at least one non-transitory computer-readable memory storing further instructions that, when executed by the at least one processor, are further effective to program the at least one processor to:

receive third image data representing a third image comprising a second subset of pixels of the first image data different from the first subset;

generate, using the image captioning model, third text data describing the third image data;

generate, using a first encoder and the third text data, fourth data representing the third text data;

determine fifth data representing a degree of similarity between the first data and the fourth data; and select the second image data for output based on a comparison of the third data and the fifth data.

20. The system of claim 13, wherein the first data and the second data are generated using a first encoder, the at least one non-transitory computer-readable memory storing further instructions that, when executed by the at least one processor, are further effective to program the at least one processor to:

generate, using a second encoder executed by the at least one computing device, fourth data representing the first text data;

generate, using the second encoder and the second text data, fifth data representing the second text data;

determine sixth data representing a degree of similarity between the fourth data and the fifth data;

input the third data and the sixth data into a neural network; and generate, by the neural network, output data indicating a semantic similarity between the first image data and the second image data.

* * * * *